US009274297B2

(12) United States Patent
Morris et al.

(10) Patent No.: US 9,274,297 B2
(45) Date of Patent: Mar. 1, 2016

(54) PHOTONIC WAVEGUIDE (75) Inventors: Terrel Morris, Garland, TX (US); Gary Gostin, Plano, TX (US); Eric Peterson, McKinney, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 861 days.

(21) Appl. No.: 13/143,649

(22) PCT Filed: Jan. 7, 2009

(86) PCT No.: PCT/US2009/030348
§ 371 (c)(1),
(2), (4) Date: Jul. 7, 2011

(87) PCT Pub. No.: WO2010/080148
PCT Pub. Date: Jul. 15, 2010

(65) Prior Publication Data
US 2011/0268386 A1 Nov. 3, 2011

(51) Int. Cl.
*G02B 6/28* (2006.01)
*G02B 6/43* (2006.01)
*G02B 6/10* (2006.01)
G02B 6/293 (2006.01)
G02B 6/35 (2006.01)
G02B 6/42 (2006.01)

(52) U.S. Cl.
CPC .. *G02B 6/43* (2013.01); *G02B 6/10* (2013.01); *G02B 6/3596* (2013.01); G02B 6/2938 (2013.01); G02B 6/3512 (2013.01); G02B 6/4214 (2013.01)

(58) Field of Classification Search
None
See application file for complete search history.

(56) References Cited

U.S. PATENT DOCUMENTS

| 4,688,892 A | 8/1987 | Laakmann |
| 4,688,893 A | 8/1987 | Laakmann |
| 5,379,354 A | 1/1995 | Jenkins |

(Continued)

FOREIGN PATENT DOCUMENTS

| CN | 1212058 | 3/1999 |
| CN | 1640044 A | 7/2005 |

(Continued)

OTHER PUBLICATIONS

Marcatili, et al., "Hollow Metallic and Dielectric Waveguides for Long Distance Optical Transmission and Lasers", The Bell System Technical Journal, Jul. 1964, pp. 11783-11809.

(Continued)

*Primary Examiner* — Ryan Lepisto
*Assistant Examiner* — Erin Chiem
(74) *Attorney, Agent, or Firm* — Thorpe North & Western (57) ABSTRACT

The system (200) provides a photonic waveguide (210) formed on a substrate (220) and a plurality of steering mirrors (230) within the photonic waveguide. The steering mirrors can be configured to direct a light beam (240) between two or more computing components (260). A plurality of steering mirror supports (250) are located within the waveguide having preset locations. The steering mirror supports are configured to enable the steering mirrors to be selectively repositioned at the preset steering mirror supports within the photonic waveguide to create varying configurations. The steering mirrors in the varying configurations direct one or more optical beams to form multiple connectivity channels between computing components within the photonic waveguide.

11 Claims, 6 Drawing Sheets

(56) References Cited

U.S. PATENT DOCUMENTS

| | | |
|---|---|---|
| 5,396,570 A | 3/1995 | Jenkins et al. |
| 5,469,518 A | 11/1995 | Song et al. |
| 5,525,190 A | 6/1996 | Wojnarowski et al. |
| 5,562,838 A | 10/1996 | Wojnarowski et al. |
| 5,737,458 A | 4/1998 | Wojnarowski et al. |
| 7,088,199 B2 | 8/2006 | Bartley et al. |
| 2003/0205065 A1 | 11/2003 | Matsuura et al. |
| 2005/0089262 A1 | 4/2005 | Jenkins et al. |
| 2006/0038168 A1* | 2/2006 | Estes et al. ............... 257/25 |
| 2006/0045417 A1 | 3/2006 | Morita |
| 2006/0171626 A1 | 8/2006 | McNie et al. |

FOREIGN PATENT DOCUMENTS

| | | |
|---|---|---|
| JP | 1991-043704 | 2/1991 |
| JP | 2000114581 A | 4/2000 |
| JP | 2000-506279 | 5/2000 |
| JP | 2002-196174 | 7/2002 |
| JP | 2003-232966 | 8/2003 |
| JP | 2003-283075 | 10/2003 |
| JP | 2004-063971 | 2/2004 |
| JP | 2004-069721 | 3/2004 |
| JP | 2006-067360 | 3/2006 |
| KR | 102003001110 | 8/2004 |
| KR | 20050040162 A | 5/2005 |
| KR | 1020060014475 A | 2/2006 |

OTHER PUBLICATIONS

Mohebbi, et al, "Silver-coated hollow-glass waveguide for applications at 800 nm" Applied Optics, Nov. 20, 2002, vol. 41, No. 33, pp. 7031 to 7035.

State Intellectual Property Office of People's Republic China Search Report, Mar. 17, 2013, CN Application No. 200980153982.5.

\* cited by examiner

FIG. 6 of the coherent light the waveguide is configured to guide. The large core hollow waveguide can have a cross-sectional shape that is square, rectangular, round, elliptical, or some other shape configured to guide an optical signal. Furthermore, because the waveguide is hollow, the light essentially travels at the speed of light in air or a vacuum.

PHOTONIC WAVEGUIDE

BACKGROUND

As computer chip speeds on circuit boards increase, communications bottlenecks in inter-chip communication are becoming a larger problem. One possible solution is to use fiber optics to interconnect high speed computer chips. However, most circuit boards involve many material layers and the tolerances employed in their manufacture is not consistent with the needs of optical interfaces. The alignment tolerance of fibers to interconnecting interfaces is generally in the range of microns. Physically placing fiber optics and connecting the fibers to the chips can be inaccurate and time consuming in circuit board manufacturing processes. Routing the optical signals around and between circuit boards can add significant additional complexity. Marketable optical interconnects between computing components have proven elusive, despite the need for broadband data transfer.

DETAILED DESCRIPTION OF EXAMPLE EMBODIMENT(S)

Additional features and advantages of the invention will be apparent from the detailed description which follows, taken in conjunction with the accompanying drawings, which together illustrate, by way of example, features of the invention. Reference will now be made to the exemplary embodiments illustrated, and specific language will be used herein to describe the same. It will nevertheless be understood that no limitation of the scope of the invention is thereby intended.

One configuration for forming optical interconnects between computer chips on a circuit board is to use optical waveguides that are not formed on the circuit board during manufacture, but are added to the circuit board after it is manufactured. Optical waveguides can be superior to fiber optic communications for interconnecting electronics in such an assembly because of the ability to form the waveguides using lithographic, injection molding, or similar accurate processes. One embodiment of the waveguides is typically formed with substantially optically transparent material, such as polymers and/or glass dielectrics.

Figure 1:
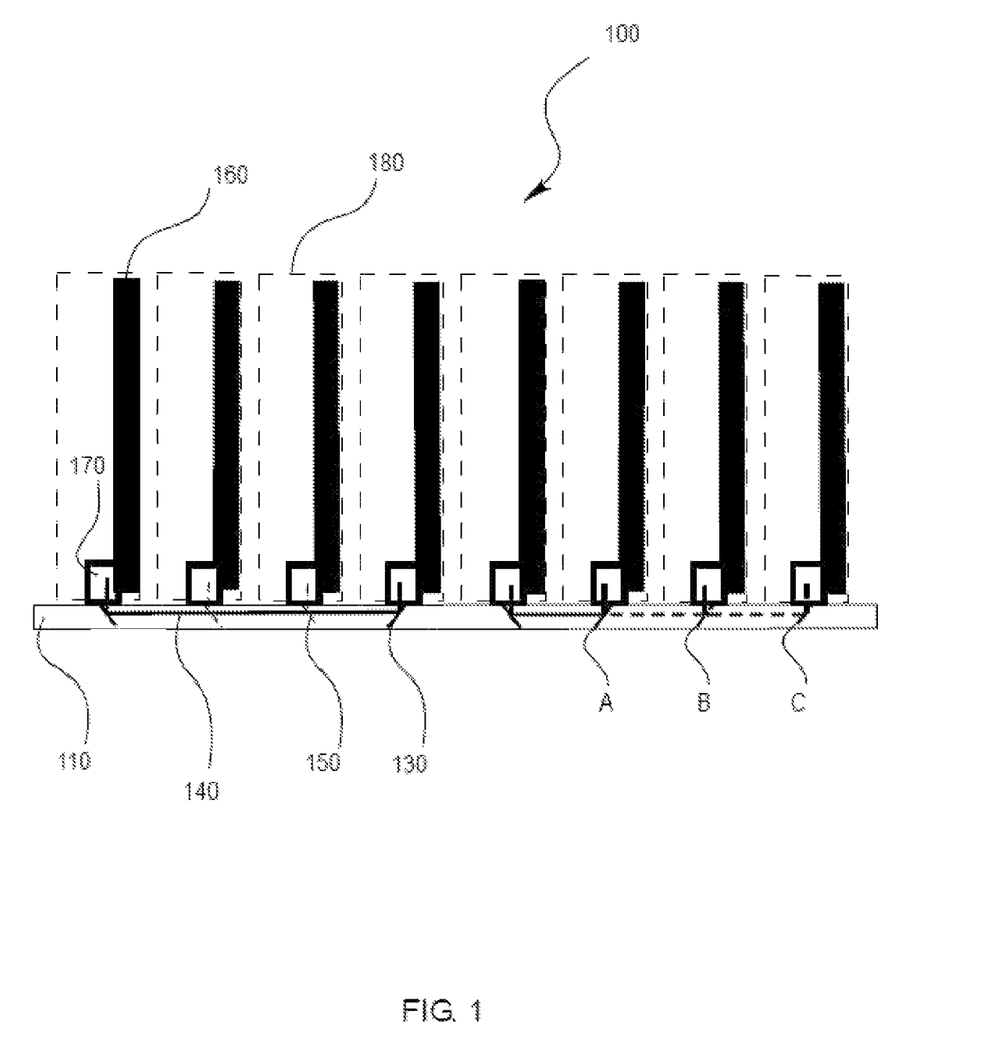
FIG. 1 is a cross-sectional side view of a reconfigurable photonic waveguide in accordance with an embodiment of the present invention.

An alternative to traditional optical waveguides formed using polymers or glass dielectric materials is the use of a large core hollow waveguide 110 configured to guide coherent light 140, as shown in FIG. 1. It is noted that the air in the large core hollow waveguide is also a dielectric. The large core hollow waveguide can have a diameter (or width and/or height) on the order of 50 to 150 or more times a wavelength of the coherent light the waveguide is configured to guide. The large core hollow waveguide can have a cross-sectional shape that is square, rectangular, round, elliptical, or some other shape configured to guide an optical signal. Furthermore, because the waveguide is hollow, the light essentially travels at the speed of light in air or a vacuum.

A laser may emit an optical beam or signal 140 into a waveguide section 110. The optical beam or signal may bounce between the walls of the waveguide. At each reflection, a substantial loss of the beam may occur. In order to decrease loss within the waveguide, a reflective coating may be added to cover an interior of the waveguide. The reflective coating can be formed using a plating, sputtering, or similar process, as can be appreciated. If the hollow waveguide comprises a polymer or other material with a low melting point, the reflective coating may be applied using a low temperature process such as sputtering, electroplating or thermal evaporation.

The reflective coating can be comprised of one or more layers of metal, dielectrics, or other materials that are substantially reflective at the wavelength of the coherent light. The metals can be selected based on their reflectivity. A highly reflective layer covering the channel is desired. For example, the reflective layer may be formed using silver, gold, aluminum, or some other metal or alloy that can form the highly reflective layer. Alternatively, the reflective layer may be a dielectric stack which can be formed from one or more layers of dielectric material that is substantially reflective at a selected wavelength. Before the reflective layer is deposited, the uncoated hollow channel may be subject to a heat reflow to smooth out any surface roughness. A number of manufacturing techniques, including but not limited to, heat reflow or electro-polishing may be used to smooth surface roughness in the reflective layer that may occur during the deposition process.

If the hollow metallized waveguide is not hermetically sealed, the reflective coating may oxidize over time. Oxidation of the reflective coating can substantially reduce its reflectivity. To reduce or eliminate degradation of the metal coating's reflectivity, a protective layer can be formed over the reflective coating. The protective layer can comprise a material that is substantially transparent at the wavelength of the coherent light. For example, the protective layer can be formed of silicon dioxide or some other material that can form a substantially air tight bond over the reflective coating. This protective layer will also reduce the propagation loss by further separating the propagating light from the lossy reflective layer.

Hollow waveguides having reflective surfaces operate differently than solid waveguides. Hollow waveguides work using the principle of attenuated total internal reflection for guiding light by reflection from the reflective layer(s) and not through total internal reflection between a higher index core region and a lower index cladding region, as typically occurs in solid waveguides such as an optical fiber. The light within the hollow waveguide may be reflected at incident angles of less than what is necessary for total internal reflection, as can be appreciated.

Some previous waveguide structures have used actively-steered-architectures. Some of the drawbacks to these architectures are the high cost and the size of such structures. Further, previous waveguide structures have required changes to the base midplane or backplane in order to use the structure with the midplane or backplane. A backplane is usually a circuit board that connects several computing components or blades to each other, forming a bus or multiple point-to-point connections, so that each computing component is linked to all of the other computing components. A backplane may be used as a backbone to connect several printed circuit boards together to make up a complete computer system. A midplane is a circuit board similar to a backplane, but whereas cards and devices connect to only one side of a backplane, a midplane has cards and devices connected to both sides. This ability to plug cards into either side of a midplane is often useful in larger systems made up primarily of modules attached to the midplane. Midplanes are used in computers, mostly in blade servers, where server blades reside on one side and the peripheral (power, networking, and other I/O) and service modules reside on the other. Midplanes are also popular in networking and telecommunications equipment where one side of the chassis accepts system processing cards and the other side of the chassis accepts network interface cards.

In previous solutions, changing connectivity between components meant changing the backplane or midplane. Backplanes or midplanes can be difficult to replace or exchange. The industry has long sought a feasible, economical, and manufacturable optical backplane. Some of the problems the industry has grappled with include the lack of an effective and manufacturable 90 degree turning solution for embedded fibers, excessive losses in polymer or plaster fiber waveguides, and single-set connectivity per backplane which limits configurability of the final solution. Whether electrical or optical interconnectivity, blade to blade or board to board computing communication has been limited in speed, density, power, distance, and signal quality. Generally additional firmware or software is also required to program connections between the blades.

This system can provide a photonic waveguide module, including a hollow core metal waveguide, which is low-cost, utilizes passive fixed steering mirrors, and has multiple potential system interconnection configurations. Installation of the waveguide module requires no changes to the midplane or the backplane. This solution utilizes a hollow metal waveguide structure in a point-to-point modular configuration to provide deterministic connectivity or communication channels between computing components. These computing components may be located on blades or boards plugged into a backplane or midplane. The module can be configured with a variety of connectivity options, thus enabling a single backplane and mechanical enclosure to serve many potential module configurations. The module can require no additional firmware or software for programming connections and can overcome many other limitations of prior electrical devices, such as limitations in speed, distance, density, power, or signal quality. In some embodiments, the optical waveguides disclosed in this application are formed on substrates using lithographic or similar processes.

FIG. 1 illustrates a photonic waveguide module 100 in accordance with one embodiment of the present invention. A hollow core metal photonic waveguide 110 is provided, which may be formed on a substrate and as described above. Within the photonic waveguide is a plurality of steering mirrors 130 to steer an optical beam or optical signal 140. An optical signal may be generated at an optical source module 170, or optical transmitter on a computing component 160, which may be encased in a blade enclosure 180, such as one made of sheet metal. (As used herein, an optical source module is a module that is capable of transmitting or receiving or both transmitting and receiving an optical signal or optical beam). The optical signal is directed toward one of the steering mirrors in the waveguide where it is reflected off the mirror to travel a distance longitudinally along the waveguide. Positioned within the waveguide is at least one other steering mirror which is configured to receive and reflect the optical signal from the waveguide to an optical receiver module or optical receiver on a different computing component. In this way, an optical signal can travel through the waveguide from one computing component to another to provide a fast and efficient optical communication between the computing components.

In one embodiment, the plurality of steering mirrors 130 may include one or more partially reflective steering mirrors 150. The partially reflective steering mirror can be configured to allow a portion of the optical signal 140 to pass through the partially reflective steering mirror, while reflecting another portion of the optical signal to an optical receiver module 170 or optical receiving unit on a computing component. An optical signal may be partially reflected by a variety of methods as are known in the art. Some examples include using polarizing mirrors, partially transparent mirrors, frequency dependent mirrors, or an area-based optical splitter.

The partially reflective mirrors 150 may be configured to provide a desired amount of power to each of the computing components to which the optical signal 140 is directed after it is split. For example, a mirror may split the beam such that a first split beam contains approximately 25% of the power of the original optical signal and a second split beam contains approximately 75% of the power of the original optical signal.

A photonic waveguide module 100 may comprise optical pathways extending between mirrors 130 and 150 and computing components 160, or optical source modules 170 on the components. Where an optical signal 140 is split, the width of the optical pathways may also be reduced based on the ratio of power that is directed into each pathway. Reducing the width of the pathways can reduce the amount of real-estate used in a circuit. By keeping the ratio of the output power to width substantially equivalent and directing the beams near the center of the pathways, beam loss can be limited by exciting the lowest order mode. The lowest order mode is the mode with the lowest loss. The lowest order mode can be excited by matching the rays in the optical signal that bounce off the mirrors to the rays corresponding to the lowest order mode of the waveguide in each of the pathways.

Figure 2:
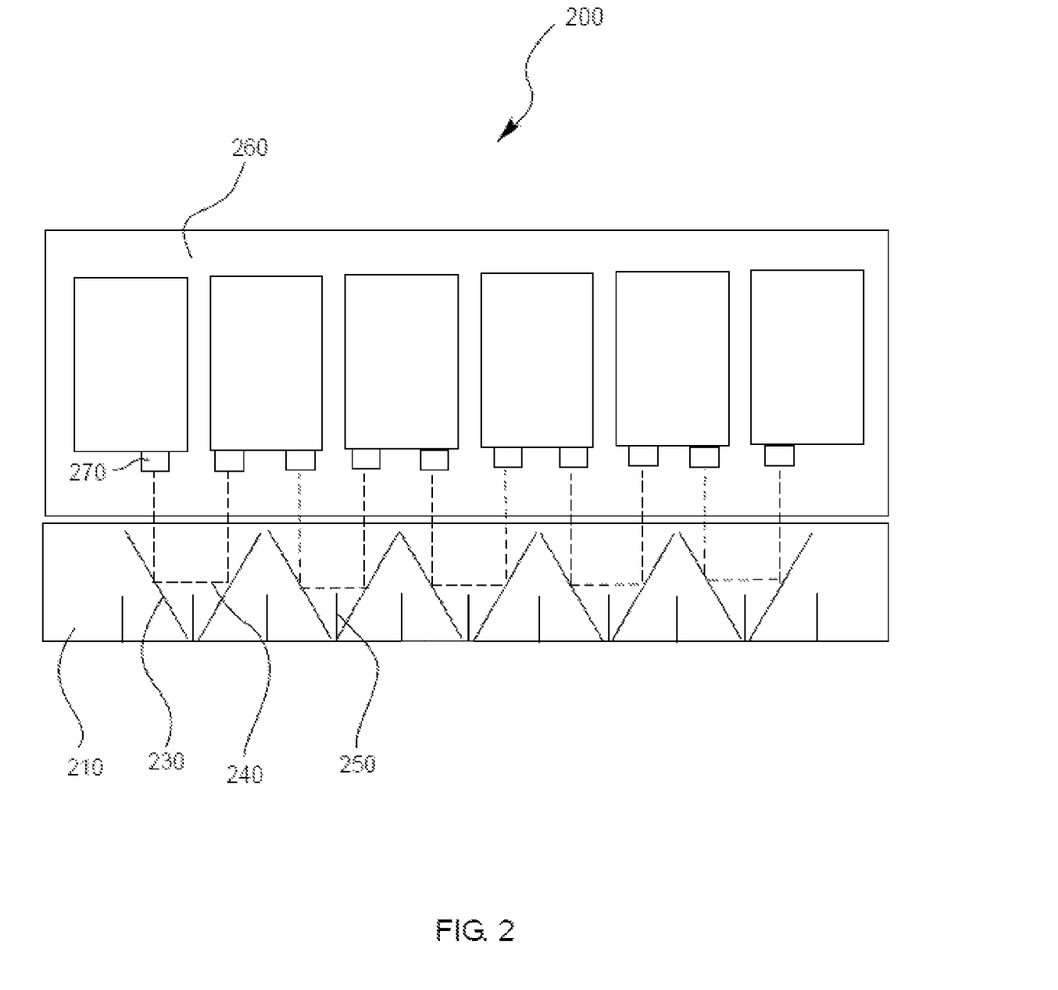
FIG. 2 is a cross-sectional side view of a photonic waveguide in accordance with an embodiment of the present invention.

Referring to FIG. 2, a photonic waveguide module 200 is provided having a hollow core photonic waveguide 210 which may be formed on a substrate. Within the photonic waveguide, there may be a plurality of steering mirror supports 250 having preset locations. These steering mirror supports allow the steering mirrors 230 to be selectively repositioned within the photonic waveguide at the steering mirror supports. The steering mirrors may be removably fixed in place within the waveguide by various attachment or affixation means as are known in the art. Some contemplated attachment means include screws, adhesives, magnets, clamps, snap-on structures, or structures which are pressed into a receiving unit. Thus, a steering mirror may be non-permanently fixed at a steering mirror support location and later be removed. A steering mirror may be removed from or added to the waveguide module to change the number of steering mirrors within the waveguide and change connectivity or communication channels between computing components. A steering mirror may be removed in order to replace it with a different steering mirror. A steering mirror may be also removed in order to reposition it at a different steering mirror support.

Repositioning the steering mirrors within the waveguide can create varying configurations or different personalities for directing an optical signal 240 between an optical source module 270 of computing components 260. It is not necessary that the optical signal be transmitted only between similar computing components. The optical signal may be also transmitted between different types of computing components. As shown in FIG. 2, an optical signal may be sent between two memory components (MEM), between two processing components (CPU), and between the memory components (MEM) and the processing components (MEM). It is to be understood that any number and type of various computing components may be used in various configurations to best suit the computing needs in a particular environment. Different type computing components may have different types of communication. These different types of communication may be sent together through a single waveguide channel but there may be a risk of cross-talk and miscommunication. Some solutions to alleviate cross-talk concerns include use of time division multiplexing or wavelength division multiplexing. However, it is recognized that a waveguide module having only one type of communication passing therethrough at any given position within the waveguide may be preferred in order to simplify the module and reduce cost.

Referring again to FIG. 1, a photonic waveguide module 100 is shown which has selectively repositionable steering mirrors 130. A steering mirror may initially be at position A, but may be selectively repositioned to position B or position C to create a different configuration, which provides optical communication between a different group of computing components than in the first configuration. Steering mirrors may be manually repositionable at the steering mirror supports within the waveguide to create a low-cost, passive optical module.

Figure 3:
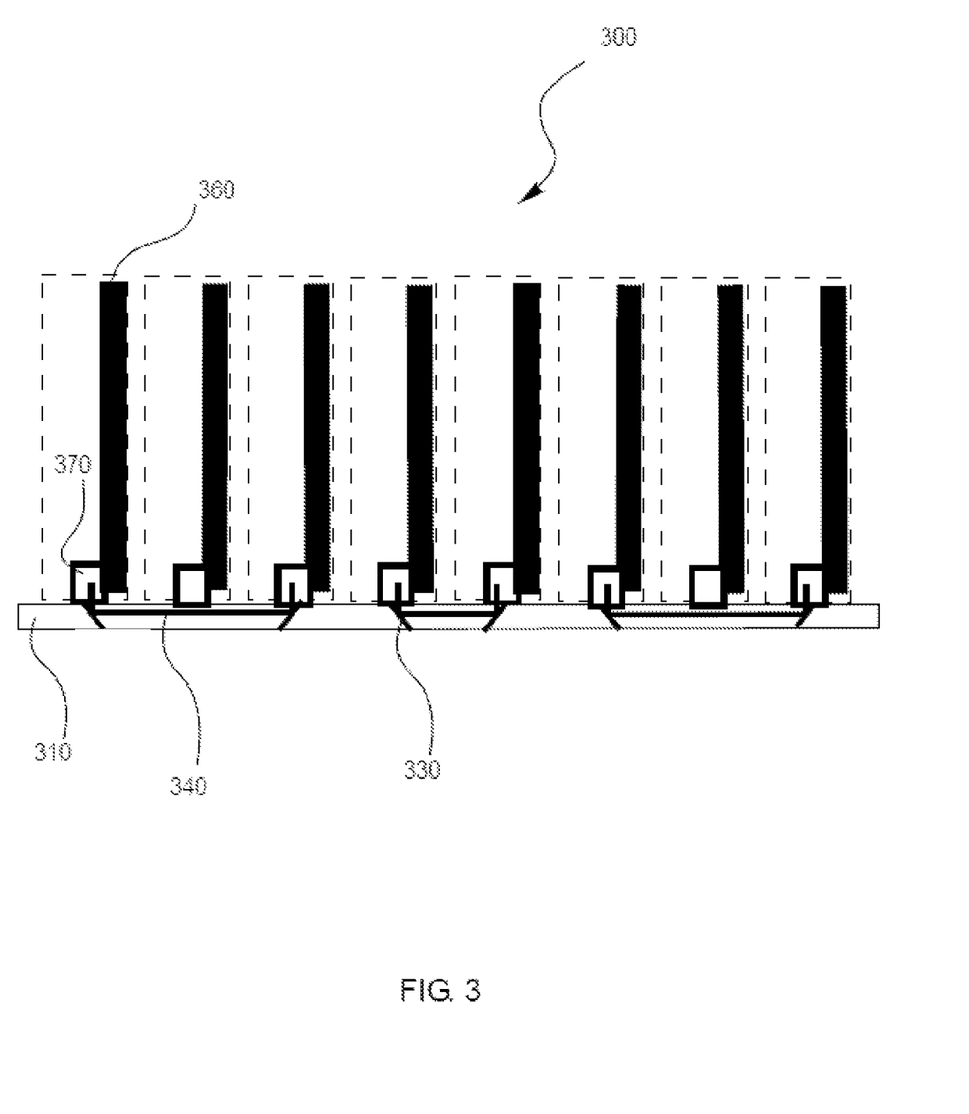
FIG. 3 is a cross-sectional side view of a photonic waveguide in accordance with an embodiment of the present invention.

FIG. 3 shows a photonic waveguide module 300 which is similar in many regards to the photonic waveguide module 100 shown in FIG. 1. The waveguide module includes a hollow, metal, photonic waveguide 310 which may be formed on a substrate. Within the waveguide are a plurality of steering mirrors 330 which direct an optical signal 340 between optical source modules 370 and computing components 360. In this embodiment, the steering mirrors are positioned in fixed preset locations within the waveguide. In one aspect, the waveguide structure can include an attachment section for removably attaching the photonic waveguide to a circuit board having computing components thereon. The waveguide module may be attached to a backplane or midplane through various attachment means as are known in the art. Some contemplated attachment means include screws, adhesives, magnets, clamps, snap-on structures, or structures which are pressed into a receiving unit.

The photonic waveguide module may be removably attached to the circuit board and may be replaced with a second optical module having steering mirrors in different preset fixed locations than the preset fixed locations of the first steering mirrors, and configured to direct the optical beam to form multiple connectivity channels between the computing components. Interreplacing waveguide modules can be a simple, low-cost method of creating different personalities (or connectivity configurations) and functionality with the same computing components. For example, there may be a system having two memory components, two central processing units (CPUs), and two graphics processing units (GPUs). A waveguide module may be configured to provide connectivity from memory to memory, CPU to CPU, and GPU to GPU. A system administrator may desire different functionality and replace the waveguide module with another waveguide module configured to provide connectivity from memory to CPU, memory to GPU, and GPU to CPU. In such a manner, the same computing components may be interconnected differently to create different functionality or connectivity simply by replacing a waveguide module.

It is to be understood that combinations of the various embodiments described herein are also contemplated. For example, selectively repositionable steering mirrors may be used in a removably attachable waveguide structure or one that is permanently fixed to a circuit board. Also, within a particular waveguide, some mirrors may be selectively repositionable while others are fixed in position. Where multiple waveguide modules are used within the same computing system, the waveguide modules may be formed differently to have different sizes, shapes, mirror positions, removable attachability, repositionable mirrors, etc.

Additionally, multiple waveguides may be formed within the same optical module to provide multiple communication pathways for different types of communications.

Figure 4:
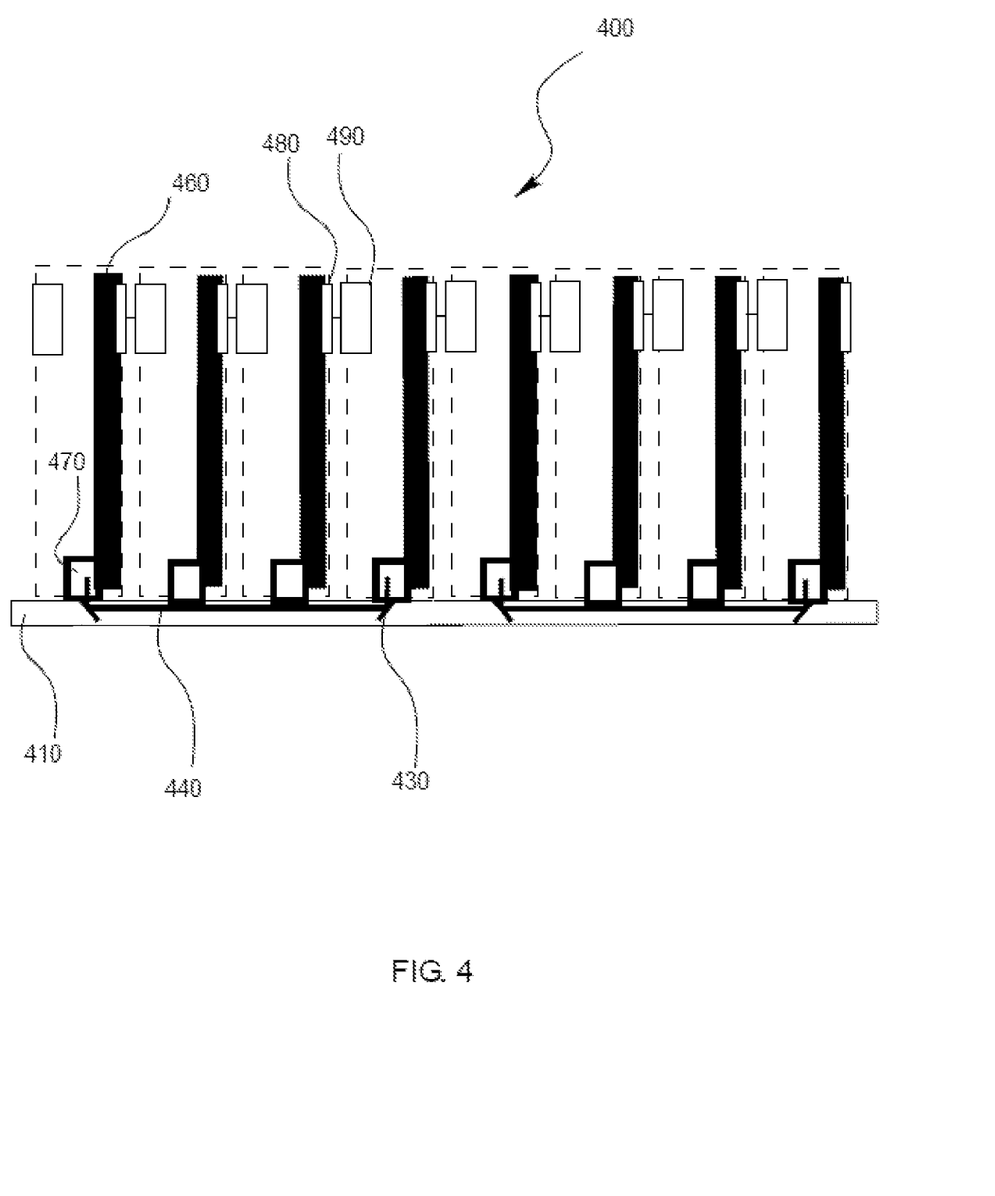
FIG. 4 is a cross-sectional side view of a photonic waveguide in accordance with an embodiment of the present invention.

Referring now to FIG. 4, a photonic waveguide module 400 is shown which is similar in many regards to the modules previously described. The module 400 may comprise a photonic waveguide 410 which may be formed on a substrate. Within the waveguide 410 are a plurality of steering mirrors 430 which direct an optical signal 440 between optical source modules 470 or computing components 460. Also shown in FIG. 4 are optical interconnects, such as optical signal source modules 480 and 490 configured to transmit and receive signals to provide additional connectivity between computing components 460. It is shown that systems using the optical waveguide structures 410 of the present invention are still compatible with various other computing connectivity devices and methods.

Figure 5:
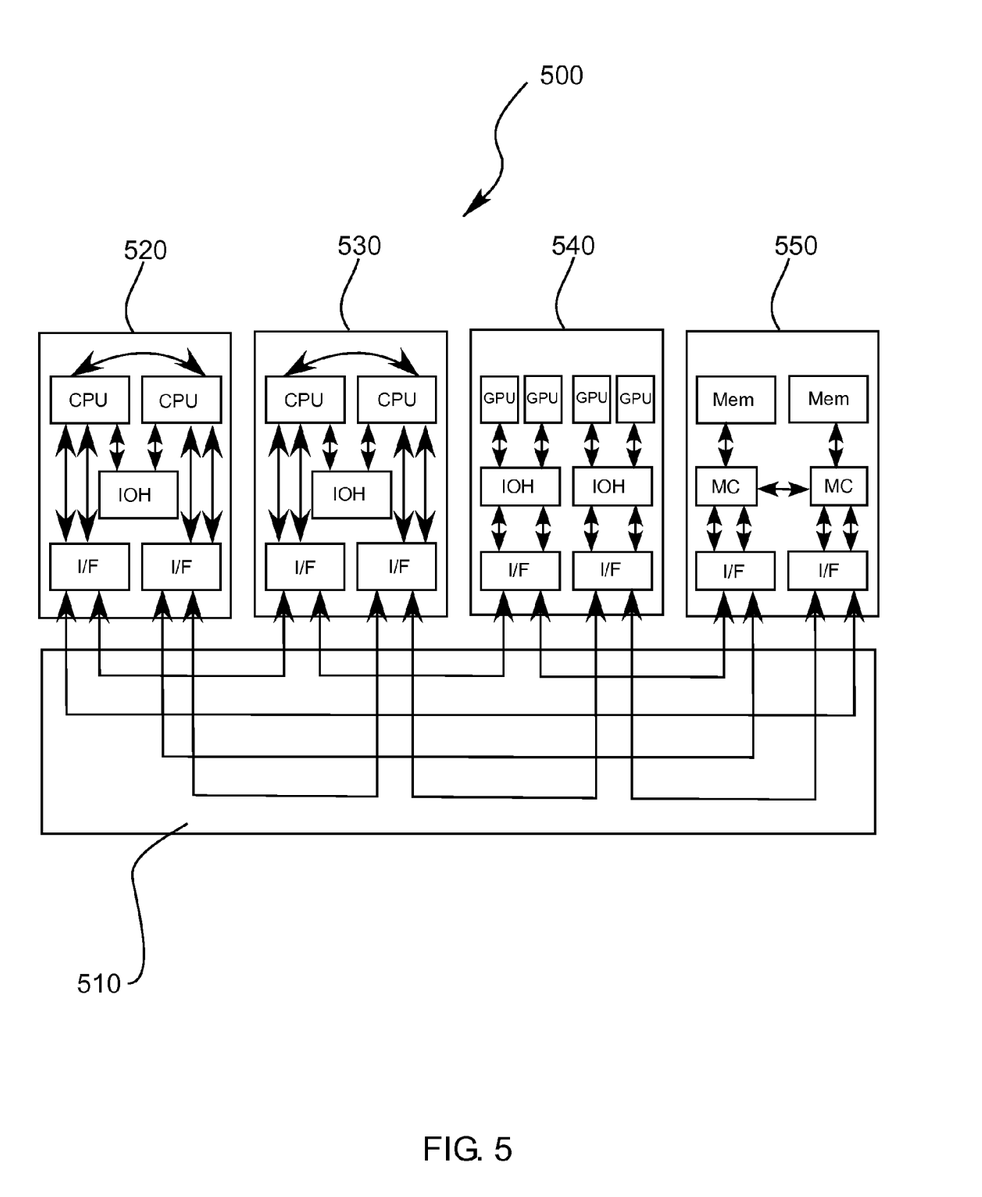
FIG. 5 is a topology map a photonic waveguide in accordance with an embodiment of the present invention cross-sectional side view of a photonic waveguide in accordance with an embodiment of the present invention.

As described above, a photonic waveguide module may be configured in any number of ways to provide the desired connectivity between computing components being used in a system. FIG. 5 depicts a topology of a computing system 500 having various computing components shown at 520, 530, 540 and 550. The optical fabric 510 provides optical interconnectivity between the various computing components. Arrows indicate communication between the components to which they point. As described above, any variety of computing components may be connected together to provide the desired functionality. FIG. 5 depicts components such as a CPU, GPU, IOH, I/F, MC, and memory component. The interface components (I/F) can provide necessary optical-to-electrical and electrical-to-optical conversion. The memory controller (MC) could be low-bin CPU or ASIC and manages the flow of data going to and from the memory. The Input/Output (I/O) Hub components (IOH) can form a bridge directly from the optical fabric to central processing units (CPUs) or graphics processing units (GPUs). In some applications, it may be advantageous to have particular communication types separate, though they share the same waveguide structure. For instance, it may be desirable to only send CPU communication between CPU's, memory information between memory chips, etc. The different types of communication may be sent together through a waveguide channel but there is a risk of cross-talk and miscommunication. Some solutions to alleviate some cross-talk concerns include use of time division multiplexing or wavelength division multiplexing.

Figure 6:
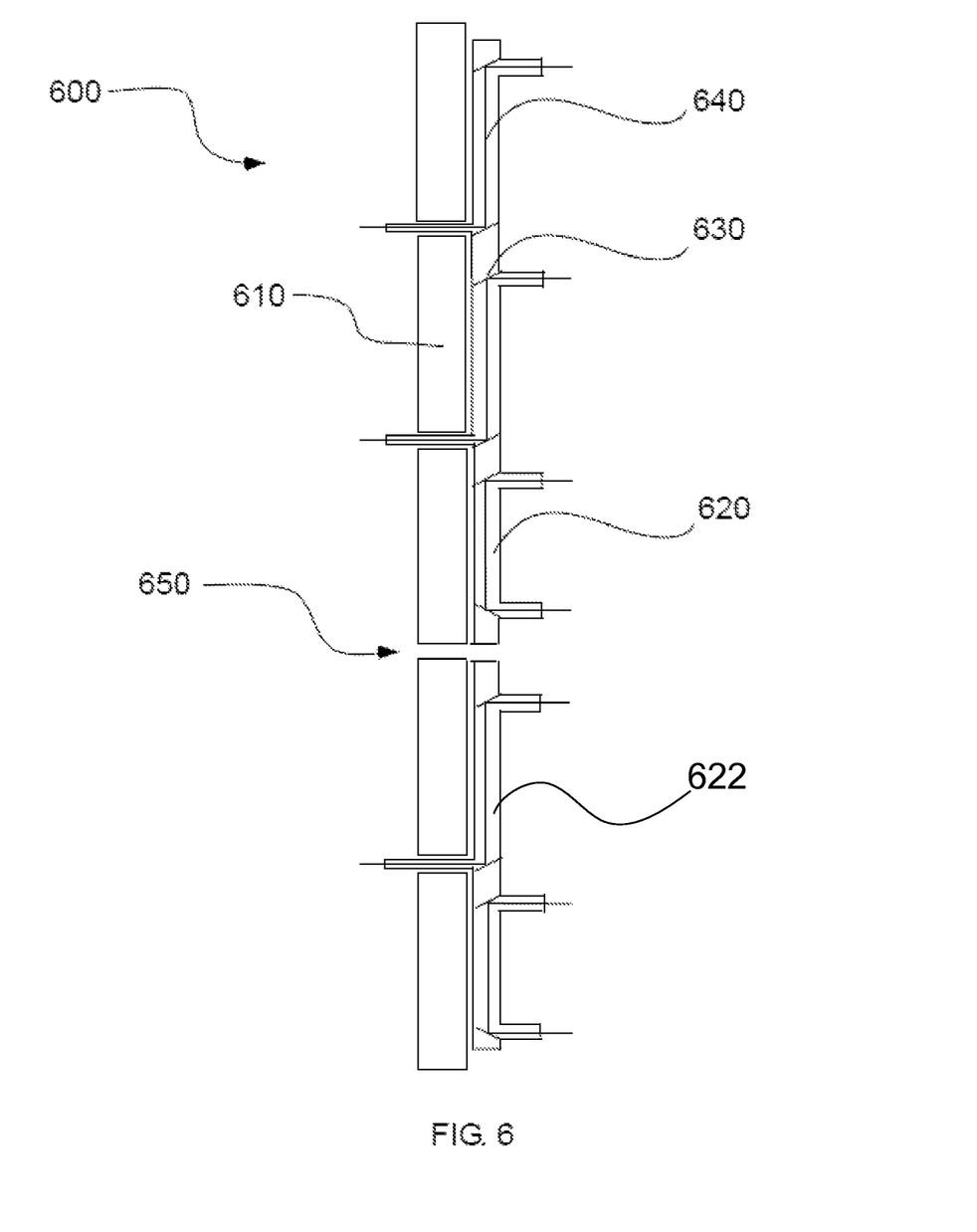
FIG. 6 is a cross-sectional side view of a photonic waveguide in accordance with an embodiment of the present invention.

FIG. 6 illustrates a photonic waveguide module 600 in accordance with an embodiment of the present invention. The waveguide 620 is attached to a midplane 610 having apertures 650 therethrough. A second wayeguide 622 may be simultaneously attached to a different portion of the midplane 610.

As discussed above, a midplane may have computing components attached to more than one side. The waveguide module may be configured to direct a light beam 640 between computing components either on the same side of the midplane, or on different sides of the midplane through proper positioning of the steering mirrors 630. An optical beam or signal 640 may be generated at a first computing component on a first side of the midplane, be reflected off a first steering mirror, pass through the waveguide, and be reflected off of a second steering mirror and through an aperture in the midplane to reach a second computing component on a second side of the midplane.

An advantage of the present invention is that it can be used in systems without requiring a change to the base midplane or backplane. The module can be attached to existing structures by various means as are known in the art, such as screws, adhesives, magnets, snap-on structures, press-in structures, etc. It is also an advantage of the present invention that it can be attached to any side of a circuit board. For instance, it may be configured to attach to any of the four edges or either of the two planar sides of a circuit board. Multiple modules may be used on a single circuit board on one or more of the six sides. In a system with multiple circuit boards, a single module may interconnect the circuit boards. Different circuit boards may also have different modules attached thereto.

The present invention allows a shrinking of the form factor for computing communications and a simplification of connectivity. The invention allows for smaller blades and midplanes. Further, the ratio of photonic density to electric is generally 26:1, based on available photonic and electronic infrastructures. The optical communications provided by this invention can work in conjunction with current existing structures and augment electrical communications. For example, blade to blade communications have been unavailable and cannot fit in an electrical infrastructure, but are made possible with the present invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An optical module, comprising:
   a photonic waveguide formed on a substrate and having an attachment section for removably attaching the photonic waveguide to a plurality of computing components;
   a first plurality of steering mirrors in preset fixed locations within the photonic waveguide, the steering mirrors being configured to direct an optical beam between the plurality of the computing components;
   wherein the optical module is replaceable with a second optical module having a second plurality of steering mirrors in different preset fixed locations than the preset fixed locations of the first plurality of steering mirrors, and configured to direct the optical beam to form at least one communication channel between the computing components.

2. An optical module in accordance with claim 1, wherein the plurality of computing components is disposed on a circuit board, and the optical module and the second optical module are simultaneously attachable to different portions of the circuit board.

3. An optical module in accordance with claim 1, further comprising a second plurality of computing components, and wherein the second optical module is attached to the second plurality of computing components when the optical module is attached to the first plurality of computing components.

4. An optical module in accordance with claim 1, wherein one or more of the plurality of steering mirrors have a permanently fixed location within the photonic waveguide.

5. An optical module in accordance with claim 1, wherein one or more of the plurality of steering mirrors are selectively repositionable within the photonic waveguide to a different configuration.

6. A computing system comprising:
   an optical signal beam;
   a plurality of computing components coupled to at least one circuit board;
   a first photonic waveguide having a plurality of steering mirrors in a first preset configuration within the waveguide and configured to direct the optical signal beam between two or more of the computing components; and
   a second photonic waveguide having a plurality of steering mirrors within the waveguide and in a second preset configuration different from the first preset configuration, and configured to direct a second optical signal beam to form multiple connectivity channels between two or more computing components within the first and second photonic waveguides respectively.

7. A computing system in accordance with claim 6, wherein the first and second photonic waveguides respectively provide waveguide functionality between different computing components at substantially the same time.

8. A computing system in accordance with claim 6, wherein the first and second photonic waveguides further comprise attachment sections for removable attachment to the at least one circuit board.

9. A computing system in accordance with claim 8, wherein the first and second photonic waveguides are interreplaceable with each other to provide different computing functionality.

10. A method, comprising:
    attaching a first photonic waveguide to a plurality of computing components, the first photonic waveguide having a first plurality of steering mirrors in preset fixed locations within the photonic waveguide, the steering mirrors being configured to direct an optical beam between the plurality of the computing components, the first photonic waveguide having an attachment section for removably attaching the photonic waveguide to the plurality of computing components; and
    replacing the first photonic waveguide with a second photonic waveguide by:
       removing the first photonic waveguide from the plurality of computing components using the attachment section; and
       attaching the second photonic waveguide to the plurality of computing components, the second photonic waveguide having a second plurality of steering mirrors in different preset fixed locations than the preset fixed locations of the first plurality of steering mirrors.

11. A method in accordance with claim 10, wherein the plurality of computing components is disposed on a circuit board, and the first photonic waveguide and the second photonic waveguide are simultaneously attachable to different portions of the circuit board.

* * * * *